United States Patent [19]

Tompkins

[11] 4,318,562
[45] Mar. 9, 1982

[54] GRASPING APPARATUS FOR HANDLING HEATED ARTICLES

[75] Inventor: Raymond E. Tompkins, Ottawa, Ill.

[73] Assignee: Libbey-Owens-Ford Company, Toledo, Ohio

[21] Appl. No.: 126,382

[22] Filed: Mar. 3, 1980

[51] Int. Cl.³ .................................... B66C 1/44
[52] U.S. Cl. .............................. 294/88; 294/11; 294/104; 414/186; 432/235
[58] Field of Search ................... 294/9-11, 294/14, 19 R, 22, 50.9, 63 R, 86 R, 88, 104, 115, 117; 414/186, 753; 432/235, 239, 245

[56] References Cited

U.S. PATENT DOCUMENTS

| | | | |
|---|---|---|---|
| 479,883 | 8/1892 | James | 414/186 |
| 566,633 | 8/1896 | Suppes | 414/186 X |
| 1,120,735 | 12/1914 | Moyer | 294/22 |
| 1,828,762 | 10/1931 | Brosius | 414/186 X |
| 1,976,977 | 10/1934 | Zinky | 294/11 |
| 3,013,835 | 12/1961 | Blatt | 294/88 |
| 3,497,255 | 2/1970 | Sindelar | 294/104 X |
| 3,945,676 | 3/1976 | Asamoto | 294/88 |

*Primary Examiner*—Johnny D. Cherry
*Attorney, Agent, or Firm*—Collins, Oberlin & Darr

[57] ABSTRACT

Apparatus for removing and installing hot refractory bricks, particularly in the checkerwork structures of the regenerators employed in glass melting furnaces, the apparatus having a manually operable, selectively actuatable claw mechanism mounted on one end of an elongated support member for gripping and moving the bricks individually at a remote location. The claw mechanism is operated by a power cylinder mounted on the other end of the elongated support member, the cylinder being manually controlled by an operator who also manipulates the support member to move a grasped brick to a desired position. A cooling medium, such as air or the like, may be employed for cooling the claw mechanism.

9 Claims, 6 Drawing Figures

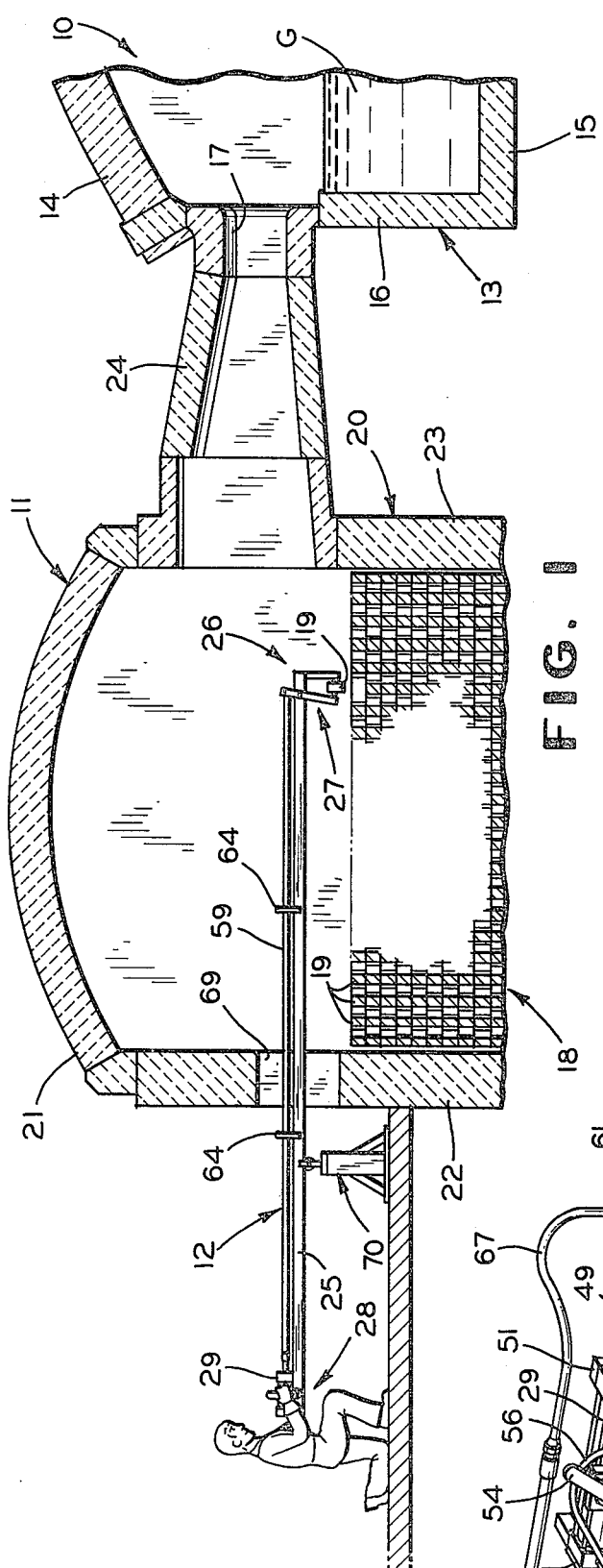
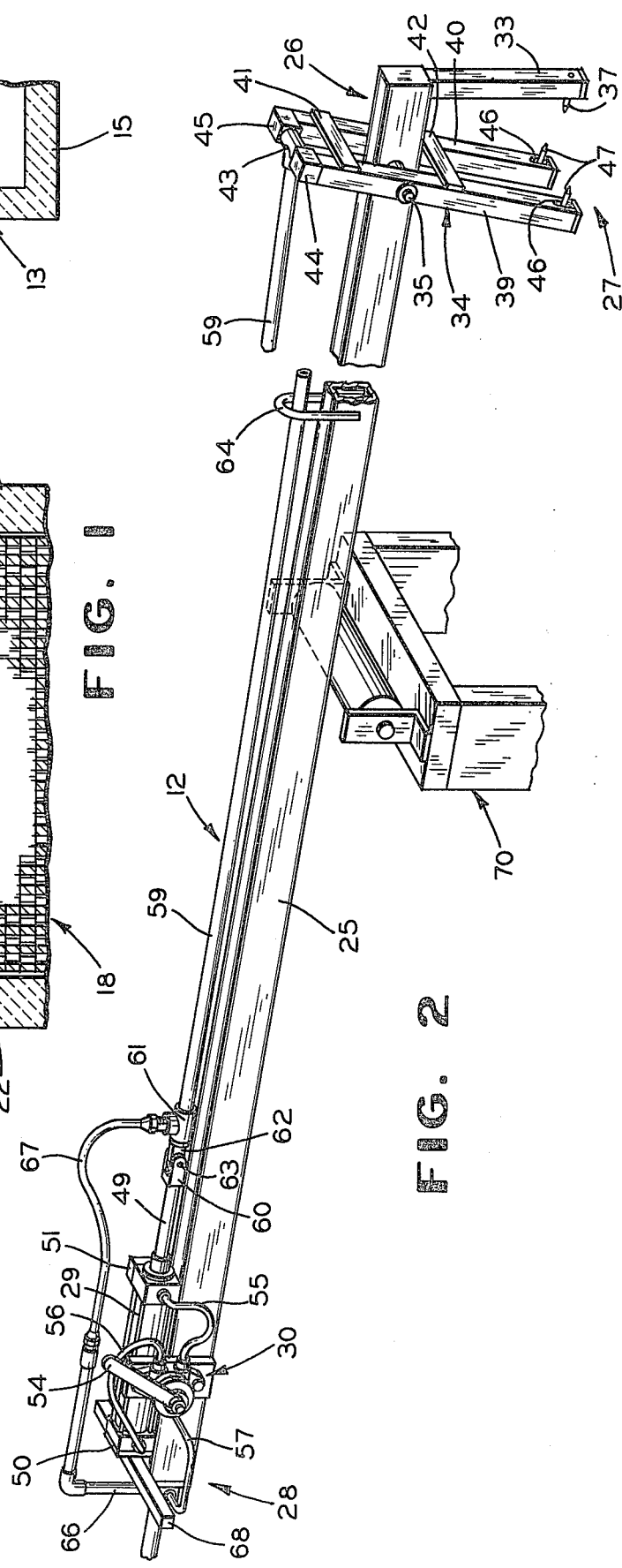

GRASPING APPARATUS FOR HANDLING HEATED ARTICLES

BACKGROUND OF THE INVENTION

1. Field of the Invention

This invention generally relates to grasping devices, and more particularly to a mechanical apparatus for selectively grasping and moving individual heated articles at remote locations.

2. Description of the Prior Art

As is well known, flat glass is produced in a continuous tank-type melting furnace wherein raw batch materials are continuously delivered to the charging end of the furnace, melted and refined as they move through the furnace, and then withdrawn from its delivery end as a continuous ribbon. In furnaces of this type, flames for melting the raw batch material are introduced through a series of spaced ports arranged along each of the opposed longitudinal side walls, the ports leading to sources of supply of fuel and preheated combustion air. The combustion air is preheated by passing through the checkerwork of the regenerators associated with the ports being fired and through which the hot waste gases have previously passed. Two two series of ports are alternately operated so that first one series of ports is fired with the opposite series exhausting the hot waste gases. Then at periodic intervals of about 20 to 30 minutes, the operating condition of the two series of ports is reversed; that is, the ports being fired serve as the exhaust ports and the ports through which the hot waste gases were being exhausted serve as the firing ports. Also, it should be noted that the operating temperatures in the port areas of the furnace are in the neighborhood of 2700° F. (1500° C.). Thus, it is apparent that the regenerators are subjected to severe use over extended periods of time as the average campaign of a furnace, that is, the period of continuous operation, may be five years or more. The severe conditions under which the regenerators operate cause extensive wear and corrosion of their checkerwork structures necessitating frequent repairs which, of course, are most difficult to perform because of the extremely high temperatures in the regenerator areas of the furnace.

SUMMARY OF THE INVENTION

Generally stated, the present invention contemplates an apparatus for individually grasping and handling hot refractory bricks, from a remote location, in the checkerwork structures of regenerators employed in tank-type glass melting furnaces. Briefly, the apparatus comprises an elongated tubular support member having a claw mechanism composed of tubular members mounted on one end of the support member. The claw mechanism is connected by a push-pull rod to a selectively controllable power cylinder mounted on the other end of the support member. A handle is provided on the support member adjacent the power cylinder so that an operator may manipulate the support member while controlling the power cylinder, and selectively operate the claw mechanism. The tubular elements provide conduits for the passage of a cooling medium such as air, for cooling the claw mechanism.

OBJECTS AND ADVANTAGES

An object of this invention is to provide a grasping apparatus for handling hot articles from remote locations and including means for cooling the apparatus.

Another object of this invention is to provide a grasping apparatus that is efficient, easily handled by an operator, and simple in construction.

Other objects and advantages will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 1 is a fragmentary cross-sectional view of a portion of a tank-type glass melting furnace together with a grasping apparatus constructed in accordance with the invention;

FIG. 2 is an enlarged, broken, perspective view of the grasping apparatus illustrated in FIG. 1;

DESCRIPTION OF THE PREFERRED EMBODIMENT

Figure 4:
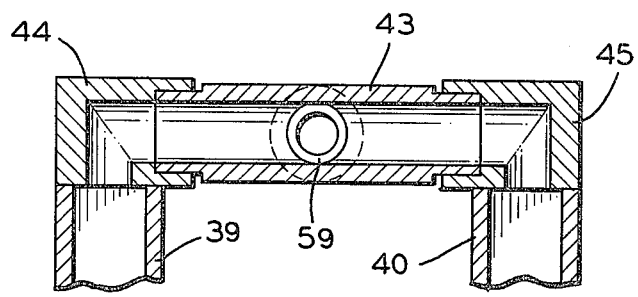
FIG. 4 is an enlarged fragmentary cross-sectional view of the claw mechanism taken substantially along line 4—4 of FIG. 3.

Referring now to FIG. 1, there is shown a portion of a continuous tank-type regenerative glass melting furnace 10 and one of its regenerators 11 in which the grasping apparatus, designated in its entirety by the reference numeral 12, may be used.

Generally, the glass melting furnace 10 includes a lower longitudinally extending refractory tank indicated by the reference numeral 13, which is covered by an independently supported sprung arch roof 14. The tank 13 is formed with a floor 15 and opposed side walls 16 (only one shown).

As is well known, raw glass making materials, i.e. batch and cullet or scrap glass, are introduced into dog houses (not shown) connected to the tank 13 by feeder devices (not shown) and reduced to a molten state in a melting zone from which they flow into and through a refining zone and are thereafter removed from the opposite or exit end of the furnace as a homogeneous molten material.

Heat for reducing the batch to molten glass within the melting zone is provided by suitable means such as burners (not shown) which discharge hot flames and products of combustion through ports 17 opening into the melting tank 13 above the level of the molten glass G flowing therethrough. As is common with furnaces of this type, the ports 17 are arranged at spaced intervals along both sides of the furnace 10.

Briefly, the regenerator 11 includes a checkerwork structure 18 composed of a plurality of stacked, spaced-apart individual bricks 19 and is conveniently contained within a unitary refractory brick housing 20 which includes among other components, a top or roof 21 and opposed side walls 22 and 23. The supply of combustion air to and exhaust of hot waste gases from the ports 17 of the furnace 10 are transmitted through a tunnel structure 24 opening into the wall 23 above the checkerwork structure 18.

Figure 5:
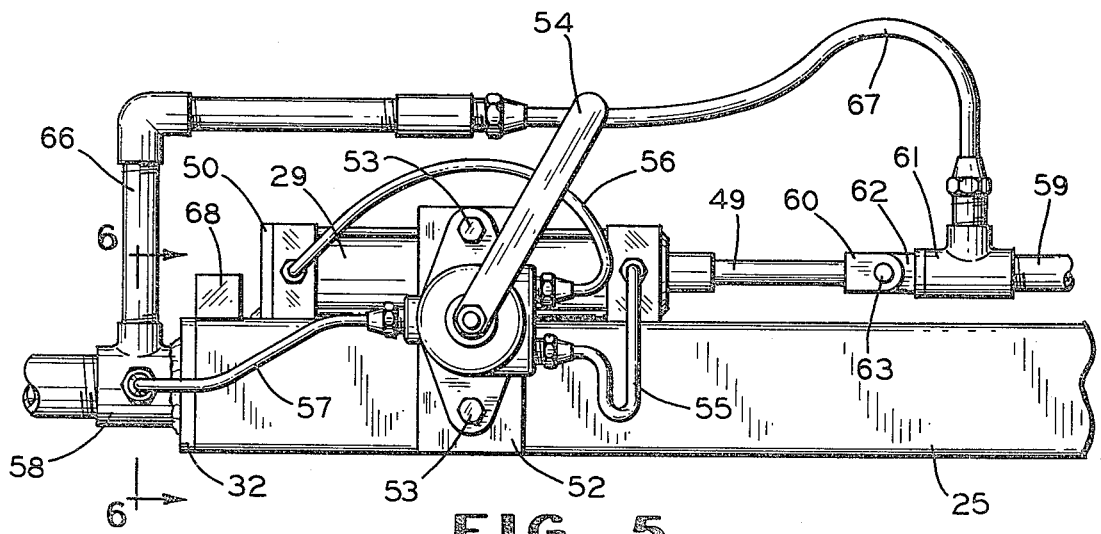
FIG. 5 is an enlarged fragmentary view of the operating mechanism employed in the grasping apparatus.

Referring now to FIG. 2, the novel grasping apparatus 12 generally includes an elongated support member 25, one end 26 being provided with a claw mechanism 27 and its opposite end 28 being provided with a power cylinder 29. The power cylinder 29 is connected to the claw mechanism and is controlled by a manually operated control valve 30 so that an operator may selectively operate the claw mechanism 27 from a remote position. As best illustrated in FIGS. 3 and 5, the elongated support member 25 is a tubular element closed at both ends by plates 31 and 32 welded thereto to form a closed passageway, and is about 20 feet (6.1 meters) in length.

Figure 3:
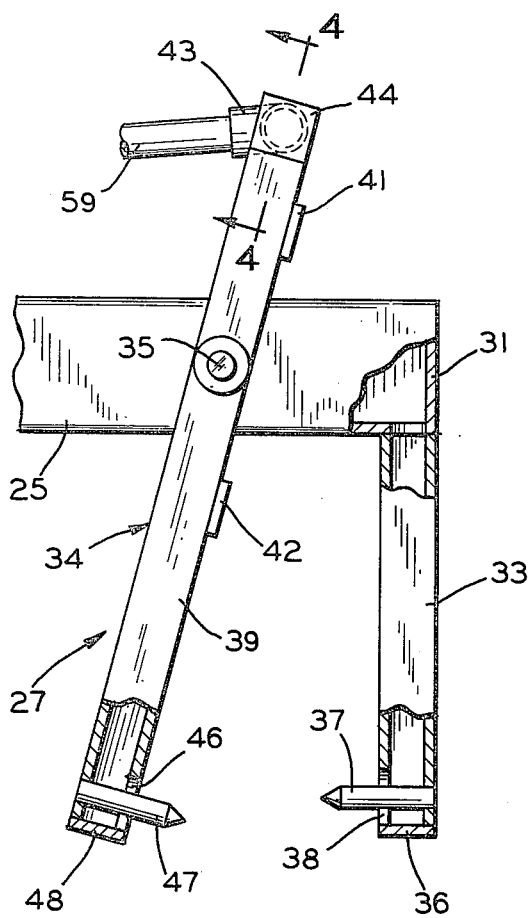
FIG. 3 is an enlarged fragmentary view of the claw mechanism employed in the grasping apparatus.
Figure 6:
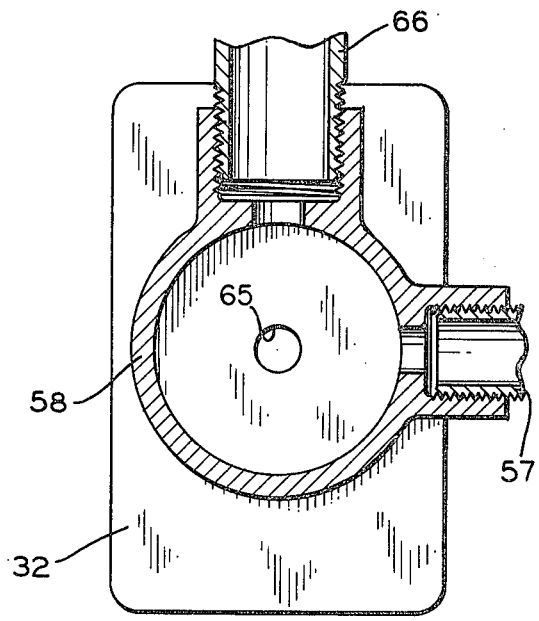
FIG. 6 is an enlarged fragmentary cross-sectional view taken substantially along line 6—6 of FIG. 5 illustrating the manifold employed in the apparatus.

Referring now to FIG. 3, the claw mechanism 27 disposed adjacent the end 26 of the support member 25 includes a depending stationary claw member 33 and a pivotal claw member 34. The pivotal claw member has a depending end movable toward and away from the stationary claw member 33 about a pivot pin 35 extending transversely through the member 25. The claw members 33 and 34 are thus adapted for gripping and releasing articles therebetween; i.e. the refractory bricks 19.

The stationary claw member 33 is a tubular member fixedly attached, as by welding, to the undersurface of the support member 25, having its internal passage at the attached end opening into the internal passage of the support member 25 and with the passage at the depending end closed by a plate 36. One side of the claw member 33 is provided with a transversely extending pointed gripping pin 37 projecting through an orifice 38.

As best illustrated in FIG. 2, the movable claw member 34 generally comprises an open frame having a pair of spaced-apart parallel legs 39 and 40 connected together by a pair of intermediately disposed tie plates 41 and 42, one plate 41 being disposed above and the other plate 42 being disposed below the support member 25. The legs 39 and 40 straddle the support member 25 so that one leg is on each side of the stationary claw member 33. Referring now to FIGS. 3 and 4, the legs are of tubular configuration and their upper ends are connected together by a tee 43, the opposite ends of which are rotatably mounted in elbows 44 and 45 fixedly secured as by welding to the upper ends of the legs 39 and 40, respectively. As best shown in FIG. 3, one side of each depending end of each leg 39 and 40 is provided with an orifice 46 surrounding a pointed gripping pin 47 affixed to the opposing side of the leg, the pins 47 facing the pin 37 in the claw member 33. The passage at the depending ends of the legs are closed by a plate 48.

Referring particularly in FIGS. 2 and 5, the power cylinder 29 is a double acting, air operated cylinder having a piston rod 49 extending from one end thereof and toward the claw mechanism 27. The power cylinder 29 is mounted adjacent the end 28 to the support member 25 by means of mounting plates 50 and 51 affixed to the support member 25. The control valve 30 is mounted on a plate 52 affixed to the support member 25 by cap screws 53. The control valve 30 is a conventional four-way manually operated valve, having a three-position selector handle 54 for transmitting air to either side of the cylinder 29 through conduits 55 and 56 and locking the cylinder in any of its extended or retracted positions. The valve 30 is connected by a conduit 57 to a manifold 58 (see FIG. 5) connected to a source of compressed air (not shown).

Referring now to FIG. 2, a push-pull rod 59 of tubular configuration is connected between a clevis 60 affixed to the piston rod 49 of the cylinder 29 and the tee 43 of the pivotal claw member 34. To this end, as best shown in FIG. 5, an elbow member 61 having a protruding flange 62 is connected to one end of the push-pull rod 59 and is pivotally secured to the clevis 60 by a pin 63. The other end of the push-pull rod is connected to the tee 43 of the claw member 34. One or more alignment guides 64 may be provided on the top surface of the member 25 for guiding the push-pull rod 59 in a linear path when it is moved reciprocally (see FIGS. 1 and 2).

As previously mentioned, the claw mechanism 27 may be cooled as by air. To this end, as shown in FIG. 5, the manifold 58 attached to the end plate 32 of the support member 25 is provided with an orifice 65 opening into the passage of the tubular support member 25. Air then may be delivered to the stationary claw member 33 from the source of air through the manifold 58, the passage in the member 25 to the claw member 33 and exiting through the orifice 38 therein. Cooling air is supplied to the movable claw member 34 through a conduit 66 having a flexible portion 67 connecting the manifold 58 to the elbow 61 connected to the end of the push-pull rod 59. Accordingly, cooling air may then be delivered from its source through the manifold 58, the conduit 67, the push-pull rod 59 to the legs 39 and 40 via the tee 43 and exiting through the orifices 46 therein.

A cross bar 68 may be attached, as by welding, to the end 28 of the support member 25 so that an operator may easily grip that end of the support member 25 to manipulate it and move the claw end to a desired location.

When it becomes necessary to repair regenerators such as the regenerator 11, the side wall 22 thereof is opened up as at 69 and the claw end of the apparatus 12 is inserted therethrough, as illustrated in FIG. 1. It should be noted that the apparatus 12 may be supported on a roll stand 70 so that an operator can more conveniently move the claw end of the apparatus to desired locations.

It is to be understood that the form of the invention herewith shown and described, is to be taken as an illustrative embodiment only of the same, and that various changes in the shape, size and arrangement of the parts may be resorted to without departing from the spirit of the invention.

I claim:

1. An apparatus for grasping individual articles at a remote location comprising an elongated support member, a claw mechanism mounted at one end of said elongated support member, said claw mechanism including a stationary claw arm and a pivotal claw arm, means for pivotally mounting said pivotal claw arm on said elongated support member whereby one end of said pivotal claw arm is movable toward and away from the corresponding end of said stationary claw arm, opposed gripping pins affixed to said stationary and pivotal claw arms, means for cooling said claw arms and said gripping pins carried thereby, moving means mounted at the other end of said elongated support member, push-pull means connecting said moving means to said pivotal claw arm for moving the depending end of said pivotal arm to-and-fro, and means for selectively actuating said moving means.

2. An apparatus for grasping individual articles at a remote location as claimed in claim 1, including means attached to said other end of said elongated support member for gripping by an operator whereby said apparatus may be manipulated to selectively grasp an individual article between said claw members and move the article to a desired location.

3. An apparatus for grasping individual articles at a remote location as claimed in claim 2, wherein said gripping means comprises a cross bar affixed to the end of said support member adjacent said moving means whereby an operator can grip said cross bar and move the claw mechanism on said support member.

4. An apparatus for grasping individual articles at a remote location as claimed in claim 1, wherein said pivotal member comprises a pair of tubular members pivotally mounted intermediate their ends on and astride said support member.

5. An apparatus for grasping individual articles at a remote location as claimed in claim 1, wherein said support member, said push-pull means and said claw mechanism comprise tubular members and said cooling means is air directed through the passages of said tubular members.

6. An apparatus for grasping individual articles at a remote location as claimed in claim 5, wherein said gripping pins extend through orifices in the opposed walls of the tubular stationary and pivotal claw arms, said orifices surrounding and being larger than said gripping pins whereby said cooling air escaping from the tubular members cools the exposed portions of said gripping pins.

7. An apparatus for grasping individual articles at a remote location as claimed in claim 1, wherein said push-pull means is an elongated rod connecting said pivotal member to said moving means.

8. An apparatus for grasping individual articles at a remote location as claimed in claim 7, wherein said means for moving said push-pull rod to-and-fro comprises a double-acting power cylinder.

9. An apparatus for grasping individual articles at a remote location as claimed in claim 8, wherein said means for selectively actuating said moving means comprises a manually operable valve.

* * * * *